United States Patent
Sommer et al.

(10) Patent No.: US 6,920,720 B2
(45) Date of Patent: Jul. 26, 2005

(54) MOTOR VEHICLE DOOR AND METHOD FOR ASSEMBLING THE MOTOR VEHICLE DOOR

(75) Inventors: Uwe Sommer, Effelder (DE); Thomas Flecke, Bamberg (DE); Markus Schultz, Nürnberg (DE)

(73) Assignee: Brose Fahrzeugteile GmbH & Co. KG, Cobrug, Coburg (DE)

( * ) Notice: Subject to any disclaimer, the term of this patent is extended or adjusted under 35 U.S.C. 154(b) by 0 days.

(21) Appl. No.: 10/296,633
(22) PCT Filed: May 23, 2001
(86) PCT No.: PCT/DE01/02074
§ 371 (c)(1),
(2), (4) Date: Nov. 25, 2002
(87) PCT Pub. No.: WO01/89868
PCT Pub. Date: Nov. 29, 2001

(65) Prior Publication Data
US 2003/0140566 A1 Jul. 31, 2003

(30) Foreign Application Priority Data
May 25, 2000 (DE) .......................................... 100 26 053

(51) Int. Cl.$^7$ .................................................. B60J 5/04
(52) U.S. Cl. .......................................................... 49/502
(58) Field of Search ................................ 49/502, 477.1; 296/146.6, 146.7

(56) References Cited

U.S. PATENT DOCUMENTS 6,076,882 A * 6/2000 Szerdahelyi et al. ..... 296/146.1
6,302,472 B1 10/2001 Rahmstorf et al.
2001/0017476 A1 * 8/2001 Nishikawa et al. ...... 296/146.6

FOREIGN PATENT DOCUMENTS

| DE | 197 44 810 A1 | 4/1999 |
|---|---|---|
| DE | 198 01 842 | 7/1999 |
| DE | 198 21 077 A1 | 11/1999 |
| DE | 199 47 209 A1 | 3/2000 |
| EP | 0 983 890 A2 | 3/2000 |

OTHER PUBLICATIONS

International Search Report of PCT/DE01/02074, filed May 23, 2001.
International Preliminary Examination Report of PCT/DE01/02074, filed Jan. 03, 2002.
English translation of International Preliminary Examination Report (IPER) for International Application PCT/DE01/02074 filed May 23, 2001.

* cited by examiner

*Primary Examiner*—Jerry Redman
(74) *Attorney, Agent, or Firm*—Christie, Parker & Hale, LLP

(57) ABSTRACT

A motor vehicle door includes a box door body formed from a door outer skin and a door inner skin, a large surface cut out section in the door inner skin capable of being covered by a wet/dry space partition with a sealing element. The motor vehicle door also includes a frame structure, containing a window frame, and is connected through a fastening part to the door body. An outer seal near the vehicle body is also formed on the vehicle door. The wet/dry space partition covers, at least in part, a fastening region near the vehicle body and a door inside window sill. The sealing element on the wet/dry space partition runs through an area overlap of the partition and another sealing element is mounted between the frame structure and the door body that extends at least from the outer contour of wet/dry space partition sealing element to the outer seal.

26 Claims, 9 Drawing Sheets

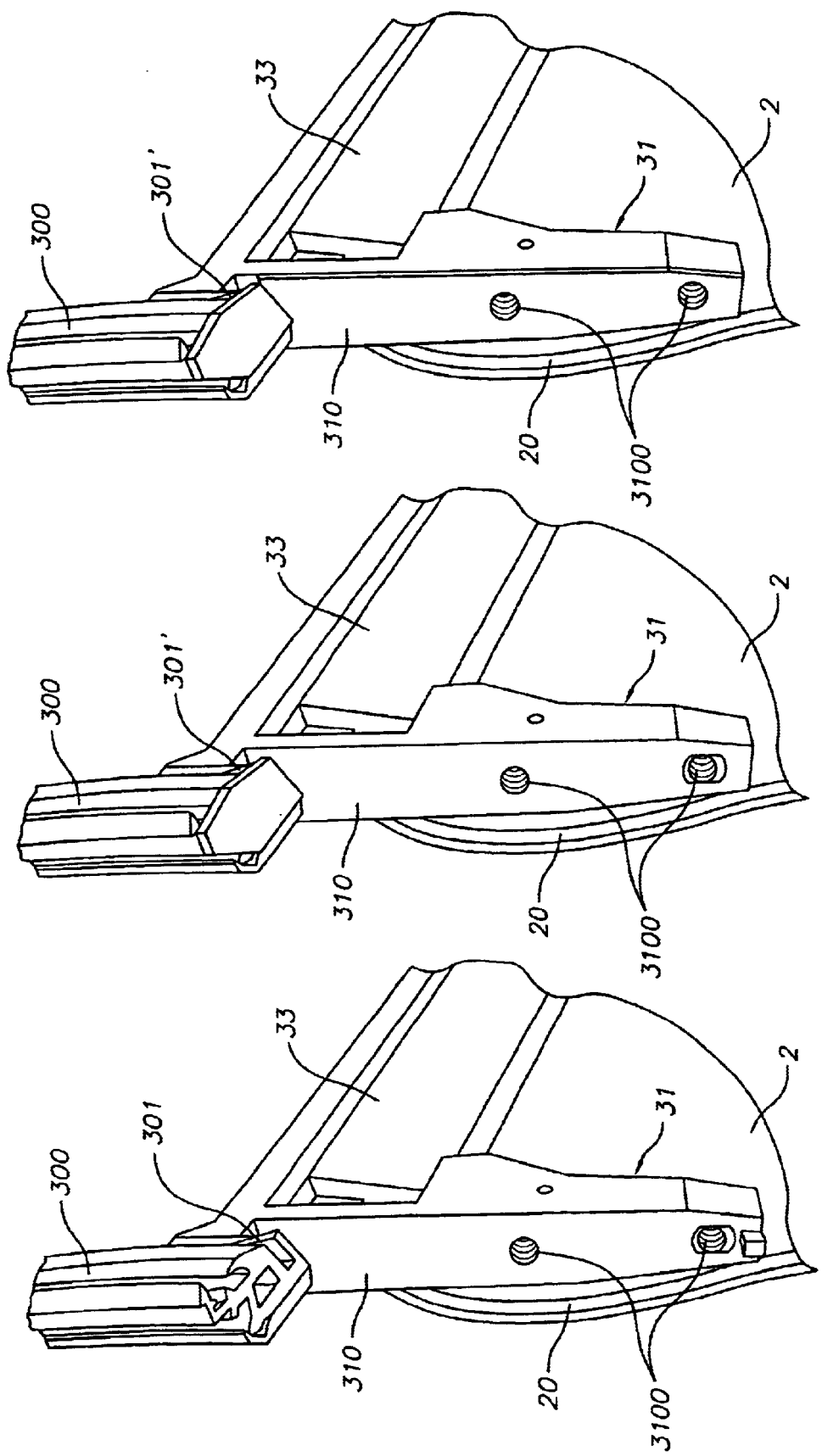

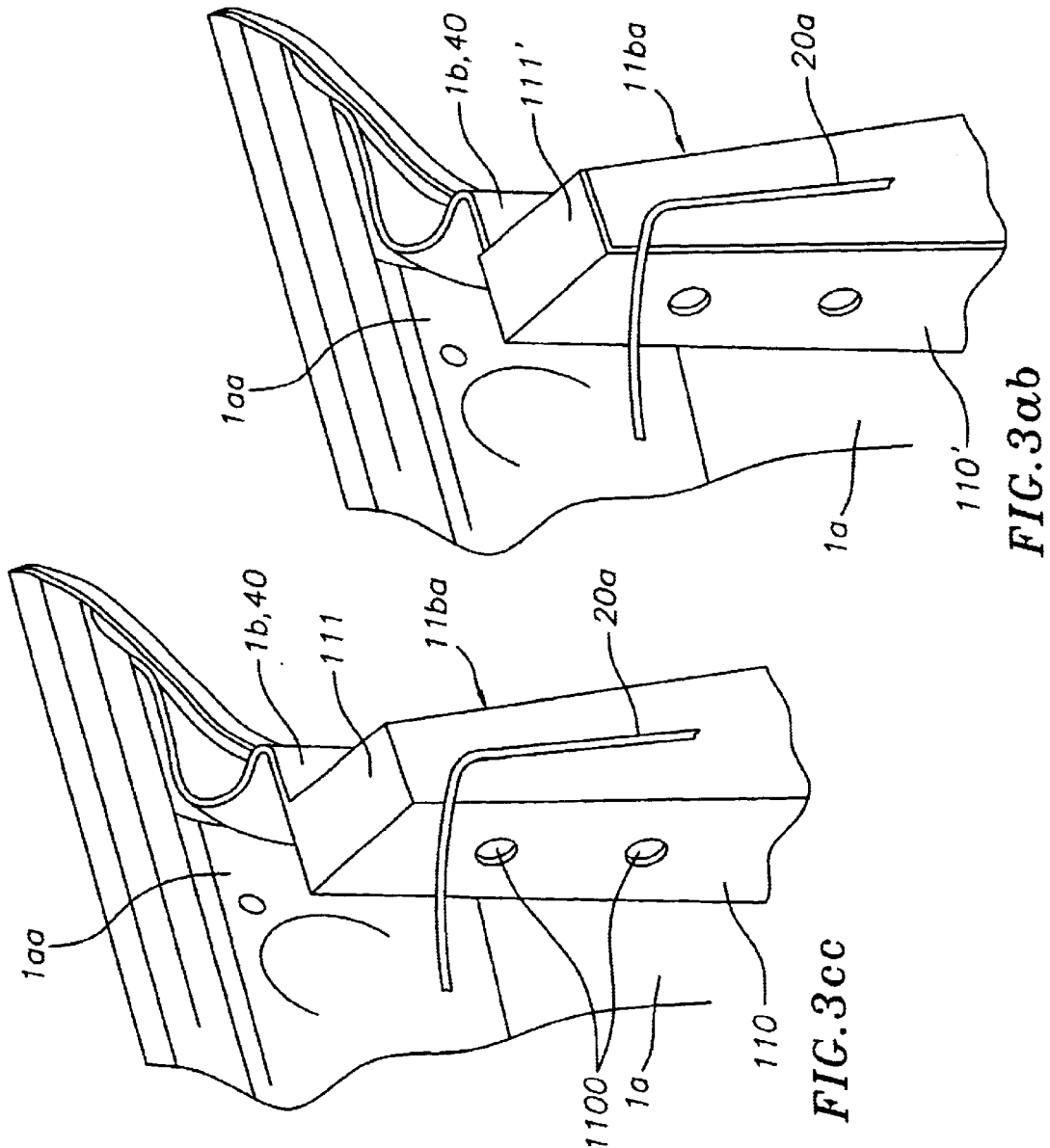

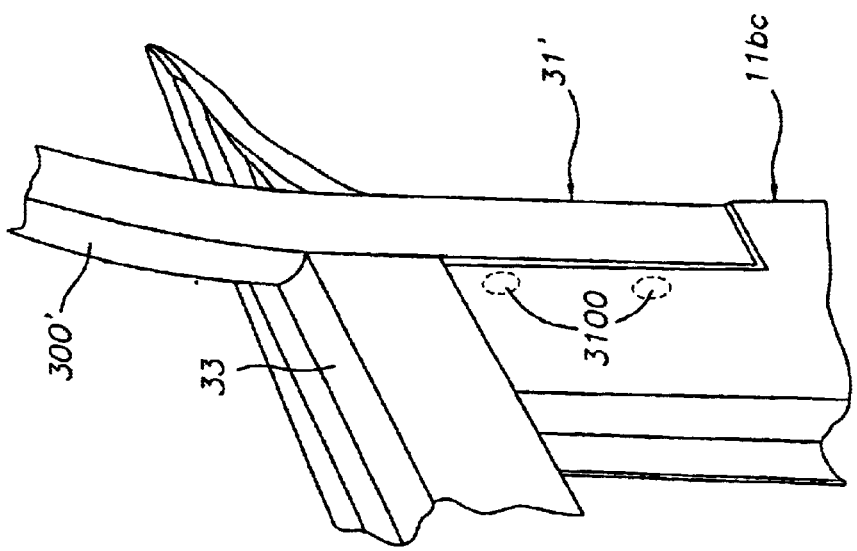
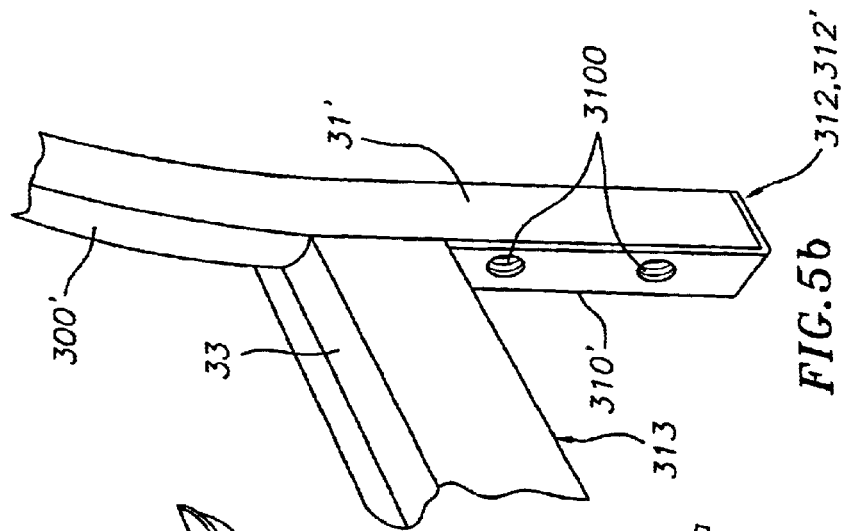
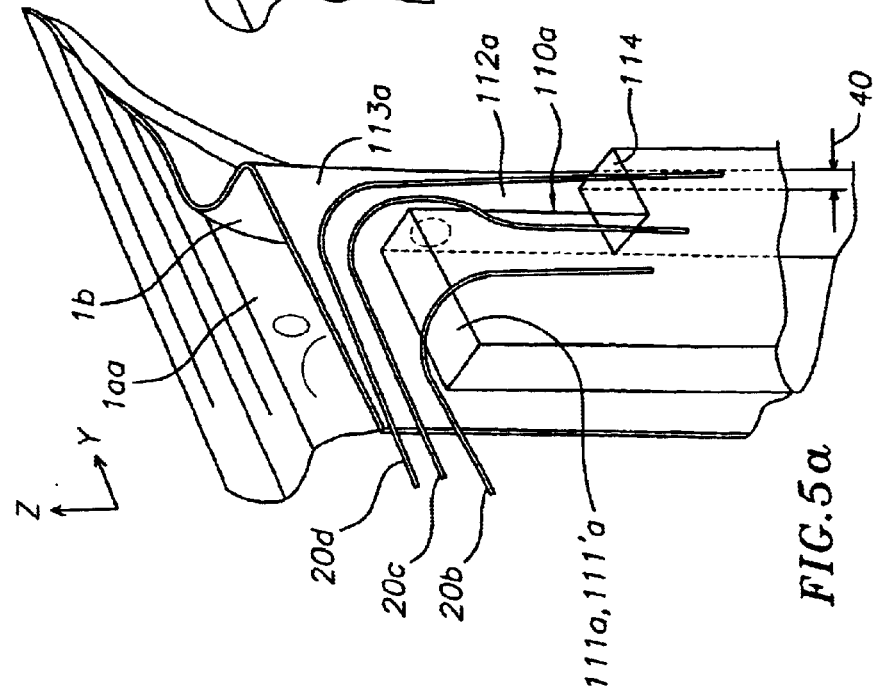

MOTOR VEHICLE DOOR AND METHOD FOR ASSEMBLING THE MOTOR VEHICLE DOOR

CROSS-REFERENCE TO RELATED APPLICATION

This application is a National Phase Patent Application of International Application Number PCT/DE01/02074, filed on May 23, 2001, which claims priority of German Patent Application No. 100 26 053.5, filed May 25, 2000.

FIELD

The invention relates to a motor vehicle door with a box-like door body, a frame structure which can be connected to it as well as with a large surface area cut-out section in the door inner skin which can be covered by a wet/dry space partition. Furthermore the invention provides an assembly process for the relevant vehicle door.

BACKGROUND

Known motor vehicle doors of this kind, which have a box-like door body and a frame structure connectable therewith, use for a cover the door inner skin whose external contour extends up to the outer seal of the door. The corresponding seal can thereby extend right into the area inside the overlapping door outer skin.

This structural design requires the door inner skin to have a very high mechanical stability and comparatively close tolerances to be observed in order to guarantee a permanent highgrade sealing section. Furthermore, relatively high production costs are involved. A further drawback of the concept described is that the overall hollow space of the door can be formed solely as a wet space which then requires the use of damp-proof door components, such as for example motors, electronic control devices, plugs and cables in a so-called wet space design.

A generic motor vehicle door is described in DE 197 44 810 A1. It consists basically of a door box with a large-surface area cut-out and a door frame module which has a window frame with a transverse profile on the door window sill side and a module support pre-fitted on the frame. The door frame module can be inserted from above into the door box and then connected to it through fixing means. The prefitted module support thereby seals in water-tight manner the cut-out section in the door inside panel of the door box so that between the module support and the door inside skin there is a dry space for mounting the functional elements such as window lifters, speakers etc. In order to seal the ledge on the inside of the door between the frame module and the door box level with the door window sill there is a v-shaped recess provided in the door inner skin beyond which extends a sealing element which runs along the edges of the window frame and door inner skin facing the inside of the door.

This technical solution also makes the door inner skin part of the seal against damp and wet although it is also established that compared to the solution first described lower forces affecting the seal have to be transferred from the fixing elements of the door inner skin. More importantly the fact has to be considered that the door inner skin through its active connection with the circumferential sealing element of the outer seal is restricted in its choice of design.

SUMMARY

The object of the invention is to develop the motor vehicle door of the generic kind which whilst using a frame module combines the advantages of a door divided into a wet and dry space with a technically simple and functionally reliable wet/dry space partition without having to involve the door inner skin in the problems of providing a seal.

In one embodiment, the structural design of the motor vehicle door is designed so that the fastening region of the box-like door body for the fastening parts of the frame structure and the door inner window sill are covered at least in part by the external contour of the sealing element of the wet/dry space partition wherein a sealing element mounted in the fixing region between the frame structure and door body extends at least from the outer contour of the sealing element of the wet/dry space partition up to the outer seal between the vehicle door and door body.

According to one embodiment, the sealing planes of the sealing elements mounted between the fastening parts of the frame structure and the fastening regions of the door body on the one hand, and of the sealing element of the wet/space partition on the other run at an angle to each other. The sealing elements can thereby criss cross each other with contact so that the outer sealing line of the wet/dry space partition, the seal between the frame structure and the door body, as well as the outer seal of the vehicle door form a cohesive sealing contour. In the event that the sealing elements criss cross each other only in the projection in the X-Z plane (door plane), thus without contact, then care must be taken so that the intermediate region has a sufficiently high resistance so that it compares quasi with a seal.

According to another embodiment, positioning means are provided which are suitable for fixing the clearance between the sealing faces of the frame structure and door body. Such positioning means can be formed integral, for example in the surface of the door body and/or fastening part supporting the sealing element, such as ribs, dished impressions or the like. If necessary the seal is recessed out in the region of the positioning means. The clearance between the facing sealing surfaces of the frame structure and door body is smaller than the height of a non-compressed elastic seal. If the clearance between the sealing surfaces between the interfitted parts (of the frame structure and door body) is greater than the height of the non-compressed seal the sealing action can be reached by operating tensioning or fixing means by means of which the distance between the sealing faces can be sufficiently reduced.

The positioning means described are suitable for improving the alignment of the parts which are to be connected as well as the precision in the dimensions of the door and to restrict the mechanical strain on the elastic seal which increases its service life.

At this point it should be pointed out that the sealing gap between the sealing surfaces of the frame structure and door body can also be filled out by an inflatable seal. It is conceivable in this connection to connect the inflatable seal to a so-called back pipe which sends the back pressure to the seal during driving. Thus the sealing action would become more intensive the faster the driving speed.

The wet/dry space partition can advantageously be formed by a support plate (e.g. of sheet metal or plastics) on which function units such as window lifter, lock, controls or the like, are prefitted. In the edge region of the support plate is a circumferential seal or the external contour of the support plate is itself designed as the seal, e.g. as a constituent part of a plastics plate which is made using 2-component injection moulding technology.

The seal which is arranged according to the invention between the frame structure and the door body can be prefitted on the frame or on the door body. Obviously it is also possible to attach parts of this seal to the frame and to the door body. Advantageously the fastening parts of the frame structure lie at least in part inside the surface area enclosed by the seal of the support plate.

The use of the invention is not restricted to special constructions of the interfaces between the frame structure and door body. It is only required that the seal running between the frame structure and the door body extends between the outside seal of the door and the sealing element of the support plate of the wet/dry space partition.

According to a design variation of the corresponding interface the substantially vertically aligned frame pillars of the window frame have projections which are formed as fastening parts and are associated with fastening regions of the door body. The fastening part is thereby connectable to a fastening region of the door inner skin which is open to the outside (facing the A, B, or C pillar), e.g. in the form of an angled socket.

A further variation however proposes that fastening parts are attached to the substantially horizontally aligned frame pillars on the door window sill side and are spaced from the edge regions of the window frame towards the centre of the door. In this case a fastening region of the door inner skin is provided which is open to the inside.

In general the frame structure will have two fastening parts which run substantially parallel and in the vertical direction. With a frame structure which has a wet/dry space partition formed as a support plate module and supporting a door lock which projects over the edge of the support plate, at least the fastening part facing away from the door lock and the associated angled socket of the door body have no projections or the like in order to ensure after "threading in" the lock into the door body and positioning the associated fastening part, unrestricted swivelling is allowed (in the Y-direction) of the other fastening part into the ideal assembly position.

When fitting the door body and frame structure a so-called reference point system (RPS) can be advantageous. The frame module with the wet/dry space partition prefitted thereon is thereby first brought into connection with the door body through the reference point system (RPS) and aligned. The fixing of the wet/dry space partition on the door body then takes place which enhances the stiffness of the door. The door body and frame structure are then fixedly connected together. During this assembly sequence it can be ensured that the wet/dry space partition does not twist or distort whereby undesired position changes of the accessory parts fixed thereon could occur. Naturally the assembly steps described above could proceed in a different sequence whilst observing the aforesaid tolerance conditions.

BRIEF DESCRIPTION OF THE DRAWINGS

The invention will now be explained in further detail with reference to the embodiments and drawings in which:

FIG. 3a shows a perspective view of a fixing region of the frame structure without sealing elements (viewed from the sides of the door outside panel);

FIG. 3b, as FIG. 3a, but with a sealing element on the downward facing end surface of the window frame side piece;

FIG. 3c, as FIG. 3a, but with sealing elements on the downward facing end surface of the window frame side piece and the screw surface of a fastening part;

FIG. 3ab shows a perspective view of a fixing region of the door body with sealing elements on the upward facing end surface and screw surface of the fixing beam (viewed towards the door outside panel);

FIG. 3cc as FIG. 3ab, but without sealing elements;

FIG. 4aa shows a perspective view of a fixing region of the door body without sealing elements for sealing the interface between the door body and the frame structure, but with clearly visible door outside seal and indicated path of the sealing element of the wet/dry space partition (viewed towards the door outside panel);

FIG. 4bb as FIG. 4aa, but with sealing elements on surfaces adjoining the fixing beam at the side;

FIG. 4cc as FIG. 4bb but additionally with sealing elements on the screw face and upwardly directed end face of the fixing beam;

DETAILED DESCRIPTION OF THE PREFERRED EMBODIMENTS

Figure 1A:
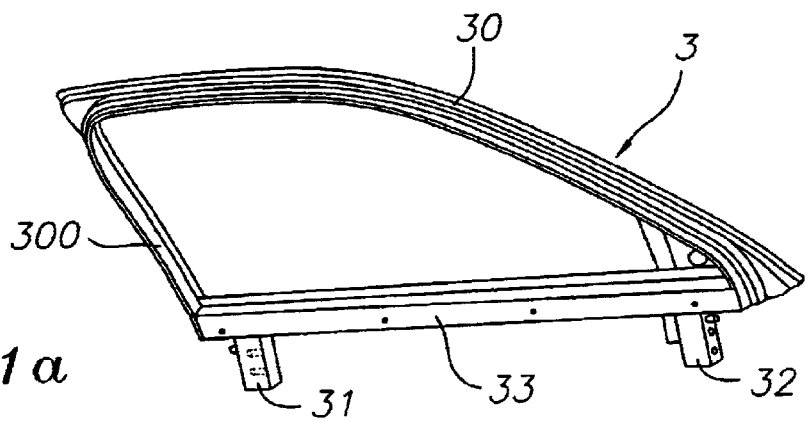
FIG. 1a shows a view of a frame structure with two side, inwardly off-set fastening parts in the form of side pieces.
Figure 1B:
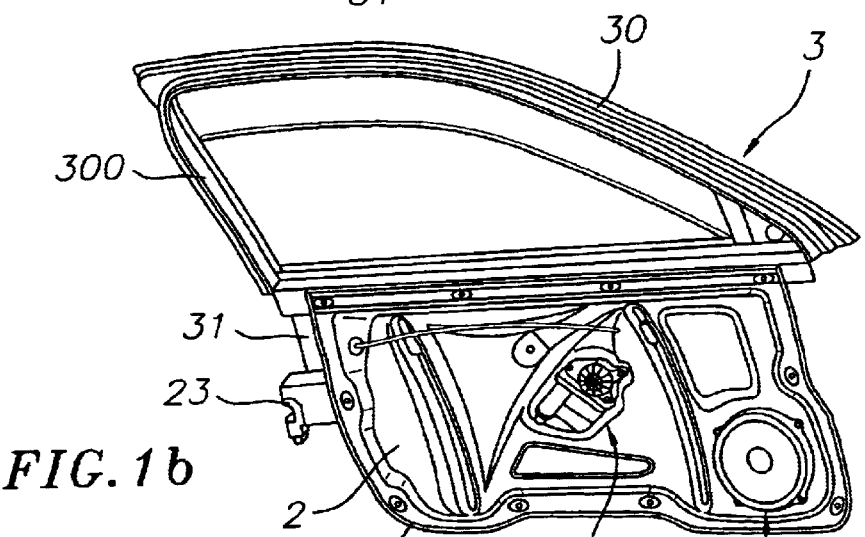
FIG. 1b shows a view of the frame structure of FIG. 1a with the wet/dry space partition fixed thereon in the form of a metal support plate.
Figure 1C:
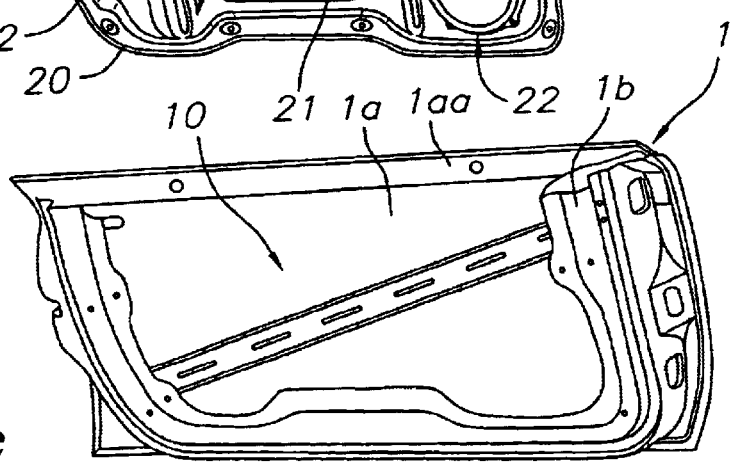
FIG. 1c shows a view of a box-shaped door body with a large surface area cut-out section in the door inside panel.

The parts illustrated in FIGS. 1a to 1c show the principle construction of a motor vehicle door, for which the seal according to the invention can be used. Accordingly the door consists substantially of the following three sub-systems:
Frame Structure:

The frame structure 3 of the depicted driver door has a window frame 30 with a vertical post-like frame region 300 on the B-pillar side which is connected to the edge of a transverse beam 33 on the window sill side. Two fastening parts 31, 32 are spaced apart and extend out from the side edges of the beam 33 functioning as the window sill reinforcement and serve to connect the frame structure 3 to the door body.

Wet/dry Space Partition:

The wet/dry space partition 2 generally represents a support plate made from metal or plastics or as a so-called Outsert part with a sealing element 20 around the edge and on which a number of function units such as e.g. window lifter drive 21, speaker 22, lock 23, cable harness and others are prefitted. The said sealing element 20 need not necessarily be formed as a separate strip-like part which is to be connected to the support plate 2. It can also be provided in the form of a large surface sealing mat or sealing foil which is placed as a lining over the support part 2. When using a wet/dry space partition 2 of plastics it is possible to injection mould the sealing element 20 in the same injection tool as the wet/dry space partition by using socalled multi-component injection moulding technology.

The modular parts described above, namely the frame structure 3 and the wet/dry space partition 2, can advantageously be connected together to form one superposed module. This is best carded out by fixing points which extend along the upper edge of the wet/dry space partition 2 and the window sill reinforcement 33. Thus during subsequent assembly on the door body only one part then has to be handled. The high degree of integration of the overriding module makes it possible to carry out an extensive prechecking of the parts systems and to meet the highest demands regarding quality.

Door Body:

The door body 1 consists of a door outer skin 1a and a door inner skin 1b which are connected together through a surround-like region. A large surface cut out section 10 which opens upwards is incorporated in the door inner skin 1b and after completing the door assembly will be closed and sealed by the wet/dry space partition 2. For this purpose the overlapping edges of the door inner skin 1b and the support plate 2 are pressed onto each other with the seal 20 interposed through fixing means (preferably screws or rivets). In the illustrated embodiment in FIG. 1c, a window sill reinforcement 1aa is additionally provided in the upper edge region of the door outer skin.

Figure 2A:
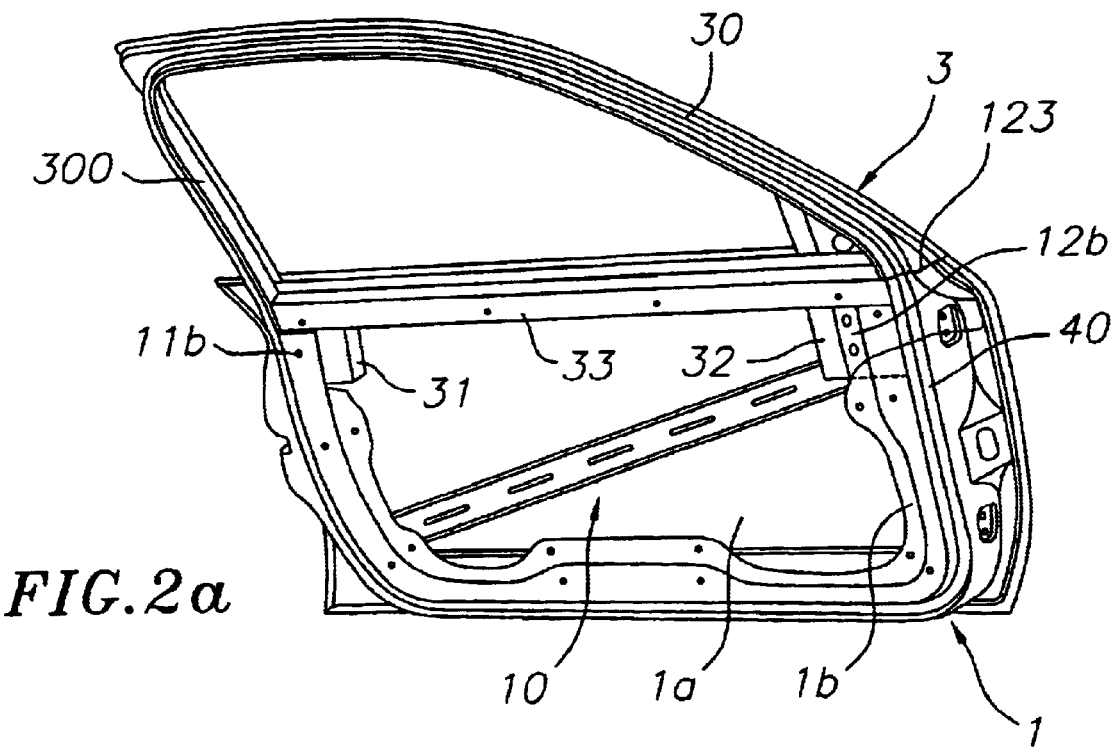
FIG. 2a shows a view of the frame structure and door body assembled without wet/dry space partition.

By leaving out the wet/dry space partition 2 FIG. 2a shows the interfaces between the door body 1 and the frame structure 3, thus the fastening parts 31, 32 of the frame structure 3 and the associated fastening regions 11b, 12b of the door body 1. The base surfaces 40 thereby also form through the join 123 between the parts 1,3 a cohesive support surface for the outside seal 4 of the door.

Figure 2B:
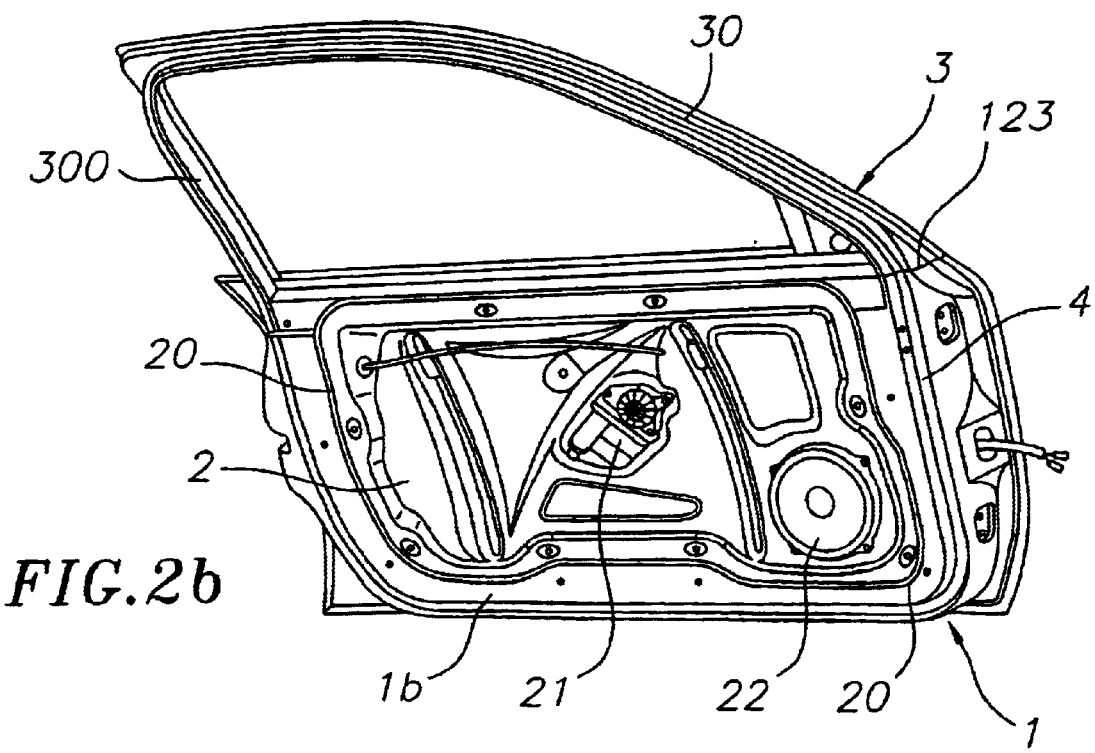
FIG. 2b shows a view of the assembled vehicle door with frame structure, door body and wet/dry space partition.

FIG. 2b shows the addition of the wet/dry space partition 2 so that the cut out section 10 and the fixing regions 11a, 11b, 31, 32 are likewise covered in part, like the intermediate region of the window sill 33. Furthermore the door outside seal 4 is indicated diagrammatically in a partial area of the base surface 40.

In order to allow a better description of some of the possible variations of the interfaces between the three partial systems frame structure 3, wet/dry space partition 2 and door body 1 FIGS. 3a–3cc show different embodiments of the fastening parts 31 on the frame side and the fastening regions 11ba of the door body 1 which can be combined therewith. The differences thereby relate solely to the arrangement of the sealing elements. According to these embodiments the fastening parts 31 are made from light metal casting and have fixing points 3100 provided with internal threads. The window sill 33 and the vertical frame region 300 are fixed or moulded thereon. The edge of the wet/dry space partition 2 supporting the sealing element 20, 20a engages at the sides (on the outside) over the fastening part 31 and thus also the adjoining fastening region 11ba on the door side as well as the interposed gap which is to be sealed.

A first combination variation exists between the fixing part 31 of FIG. 3a and the beam-like fastening region 11ba of FIG. 3ab whose screw surface 110' and upwardly aligned end surface 111' are covered with sealing elements. The path of the outer seal 20a which is illustrated diagrammatically shows that this intersects with contact the seal arranged on the screw face 110'. The door inside seal (not shown) which is in contact with the sealing element of the end face 111' extends on the base surface 40 of the door inner skin 1b. A secure protection of the vehicle interior from the outside dampness is ensured through this combination of sealing elements 20, 20a, 4, 40, 110', 111'.

The sealing variation of the door body according to FIG. 3ab can obviously also be combined with the frame structure variations of FIGS. 3a and 3c. It is however more advantageous to assign only one sealing element to one sealing gap so that with a combination of the variations of FIGS. 3b and 3ab the sealing element of the support surface 111' ought to be omitted. In this case the one side edge of the sealing element arranged on the downward facing end surface 301' would adjoin against the door outside seal 4. For the embodiment variation of FIG. 3c with the sealing elements on the screw face 310' and end face 301' there is the seal-free variation of FIG. 3cc.

The corresponding sealing elements can thus be combined in very different ways and are preferably fixed by adhesive on the selected surfaces 110', 111', 301', 310'. In each case these sealing elements arranged between the fastening regions 11b, 11ba, 11bb, 11bc, 12b, 31, 32 of the frame structure 3 and door body 1 and having the sealing elements 20, 20a, 20b, 20c, 20d of the wet/dry space partition 2 and the outer seal 4 of the door body 1 form a composite or cohesive bond without restricting the freedom of design for the door.

Figure 3E:
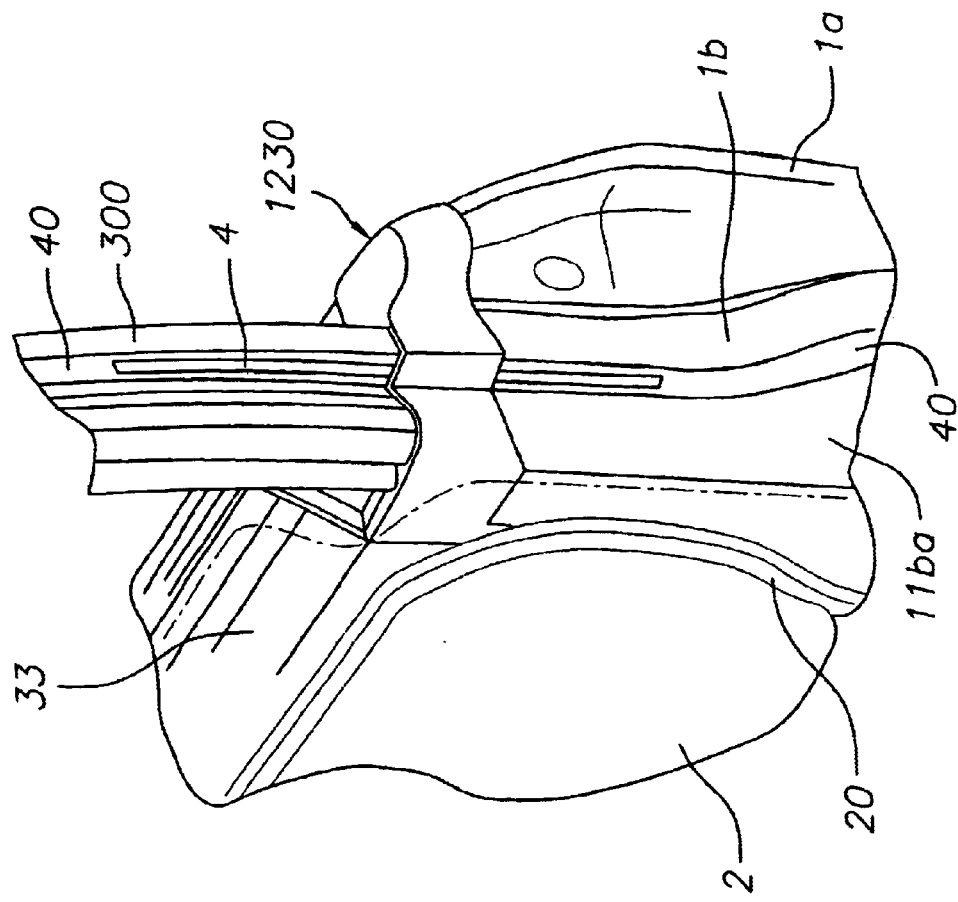
FIG. 3e as FIG. 3d but with a design element to cover the join.
Figure 3D:
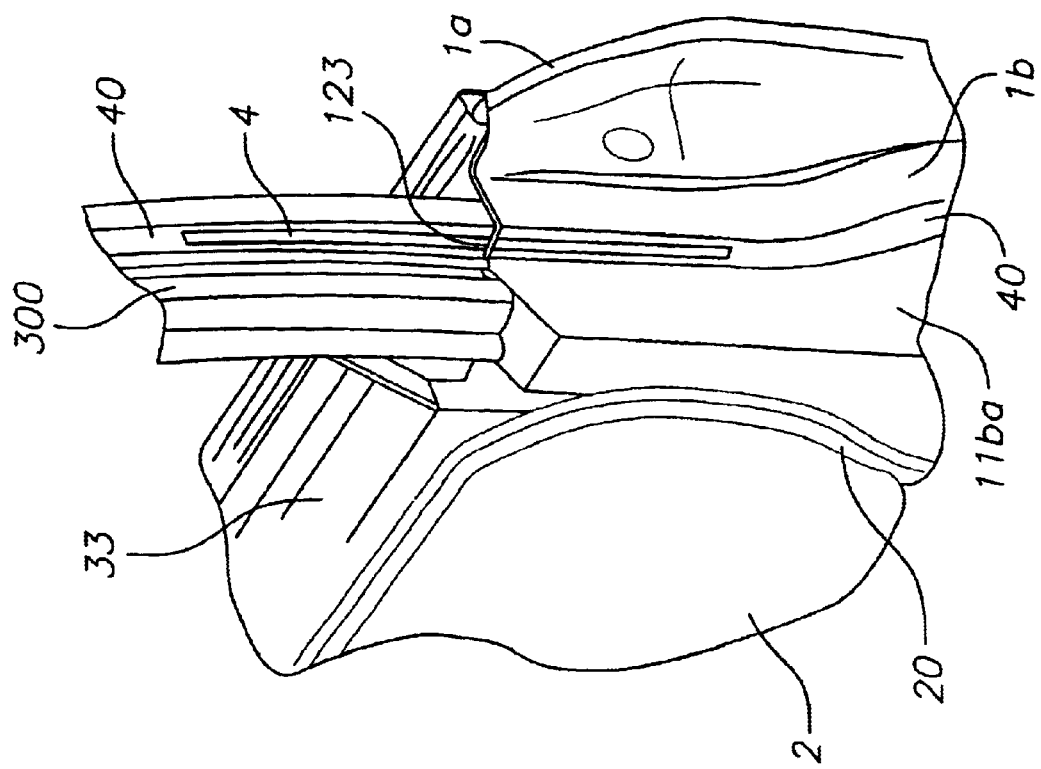
FIG. 3d shows a perspective view of a door cut-out section in the region of the join between the door body and frame structure, with the door outside seal clearly visible.

FIG. 3d shows the corresponding door section after assembly in the region of the join 123 between the frame structure 3 and the door body 1 as well as the indicated path of the outer seal 4. The path of the sealing element 20 extends over a part of the fastening region 11ba on the body side, the fastening part 31 of the frame structure 3 as dwell as the shaft reinforcement 33. In FIG. 3e a design element 1230 is shown which covers the join 123 and which is covered in part by a door inside trim (not shown) whose external contour 5 is indicated by a chain-dotted line.

Figure 4C:
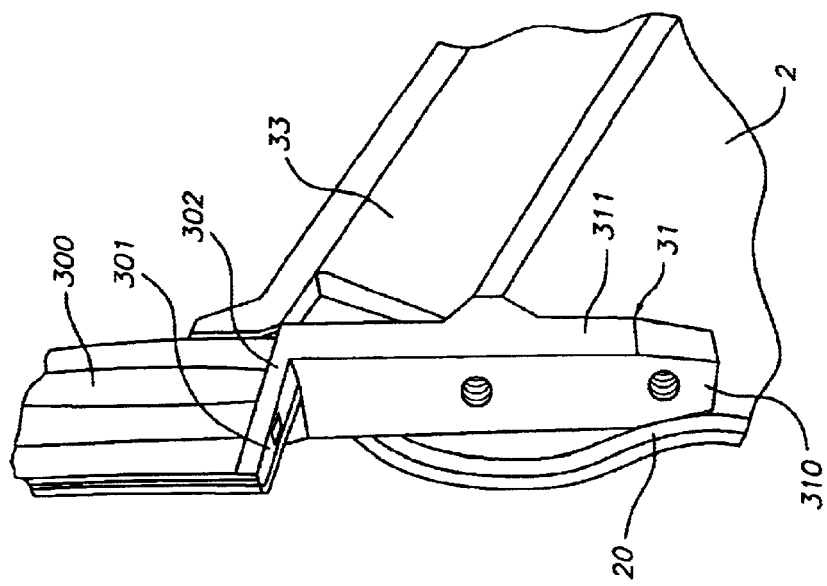
FIG. 4c shows a perspective view of a fixing region of the frame structure without sealing elements.
Figure 4B:
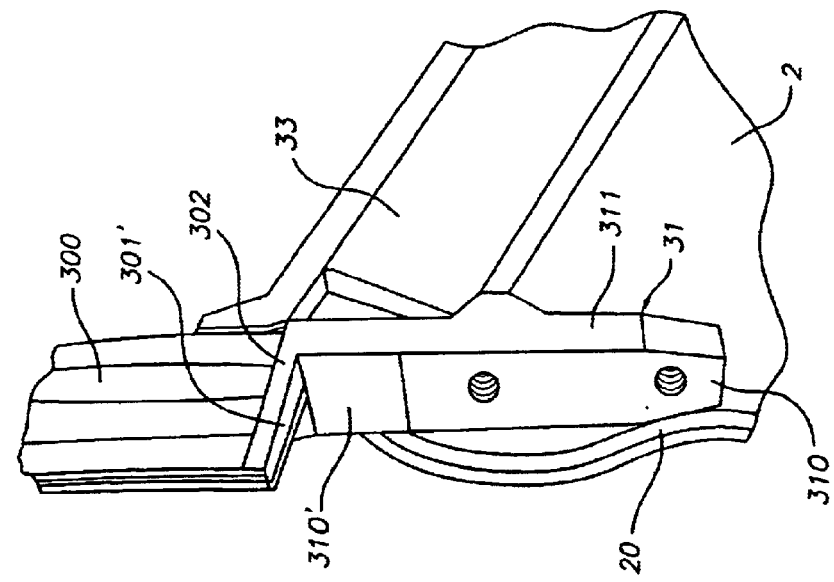
FIG. 4b shows a perspective view of a fixing region of the frame structure with sealing elements on two sealing faces which run at an angle to each other (viewed from the sides of the door outside panel)
Figure 4A:
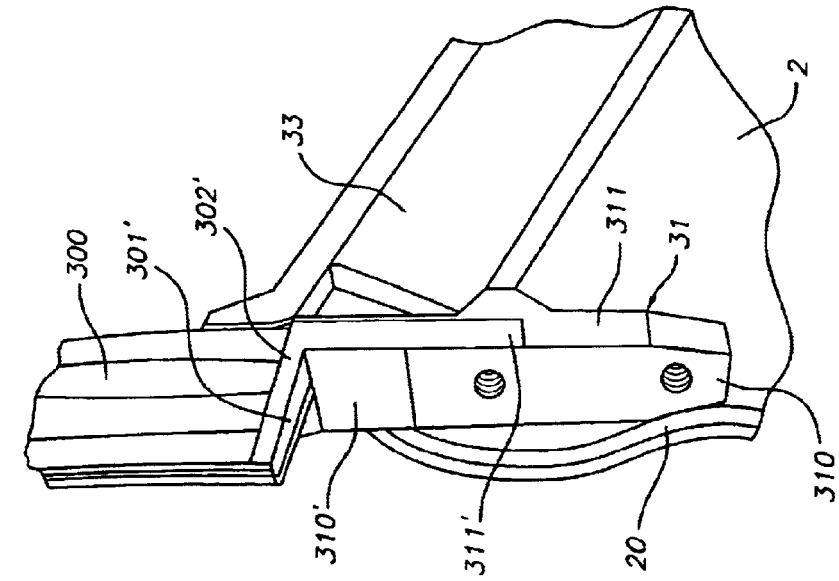
FIG. 4a shows a perspective view of a fixing region of the frame structure with sealing elements on three sealing faces running at an angle to each other (viewed from the sides of the door outside panel)
Figure 4C:
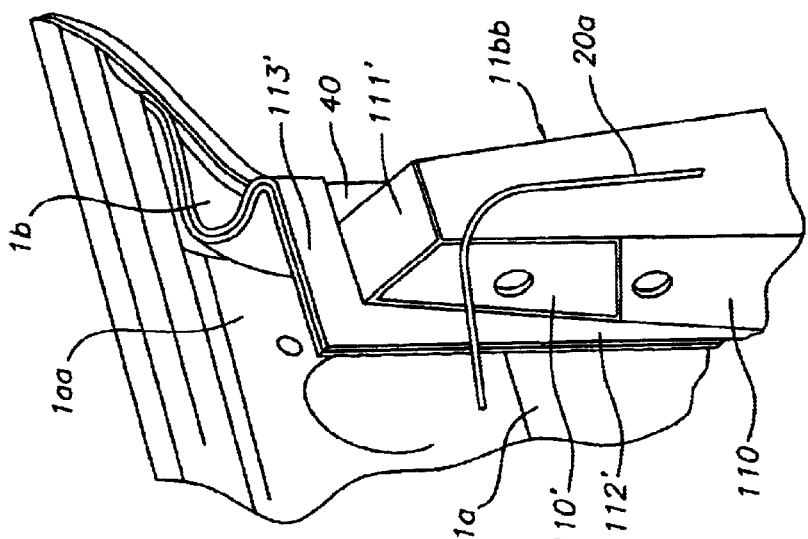
Figure 4B:
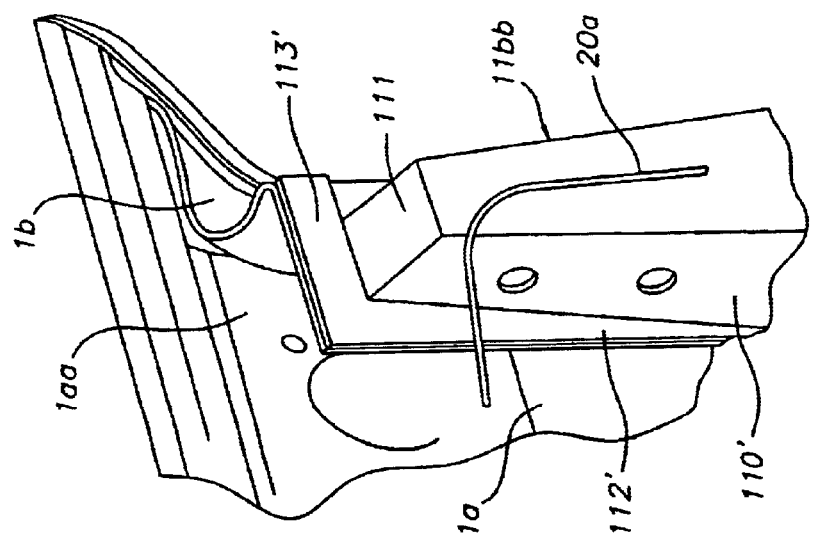
Figure 4A:
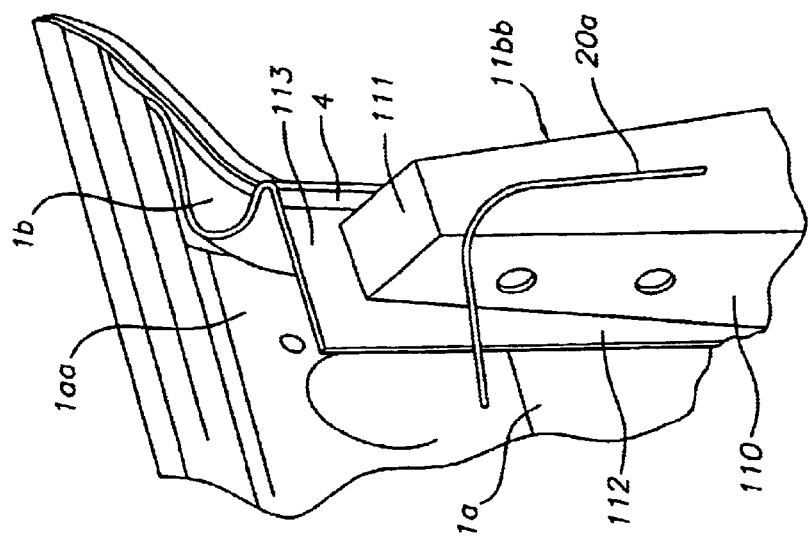

According to a further variation of the invention, see FIGS. 4aa–4cc, the strut-like fastening region 11bb on the body side is adjoined by side support faces 112, 112', 113, 113' which are associated with faces 302, 302', 310, 310', 311, 311' of the fastening part 31 on the frame structure side. The path of the sealing element 20, 20a of the support plate 2 is unchanged relative to the variation described above (FIGS. 3a–3e).

According to this the designs according to FIGS. 4a and 4aa are to be combined with each other whereby the fastening part on the frame structure side supports all the sealing elements which are attached to the faces 301', 302', 310', 311' in three planes and correspond with associated faces 110, 111, 112, 113 of the fastening region 11bb of the door body 1. The outer seal 4 running on the side face 40 can thus be formed and arranged so that it contacts both the seal on the surface 301' and the seal on the surface 302'.

With the embodiment of FIGS. 4b and 4bb the sealing elements are spread out over the fastening regions 11bb, 31 of the frame structure 3 and the door body 1 whilst according to the variation of FIGS. 4c and 4cc all the sealing elements are prefitted on the fastening region 11bb on the door body side.

Figure 4E:
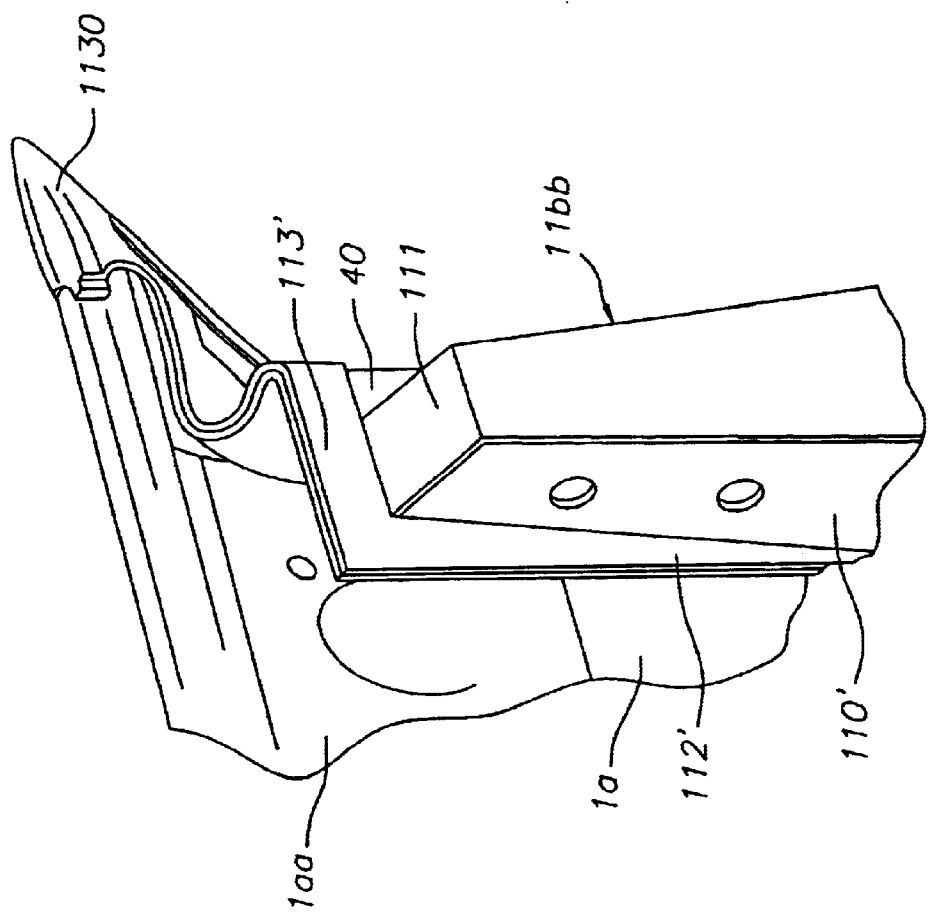
FIG. 4e as FIG. 4d but with a design element covering the body work edge.
Figure 4D:
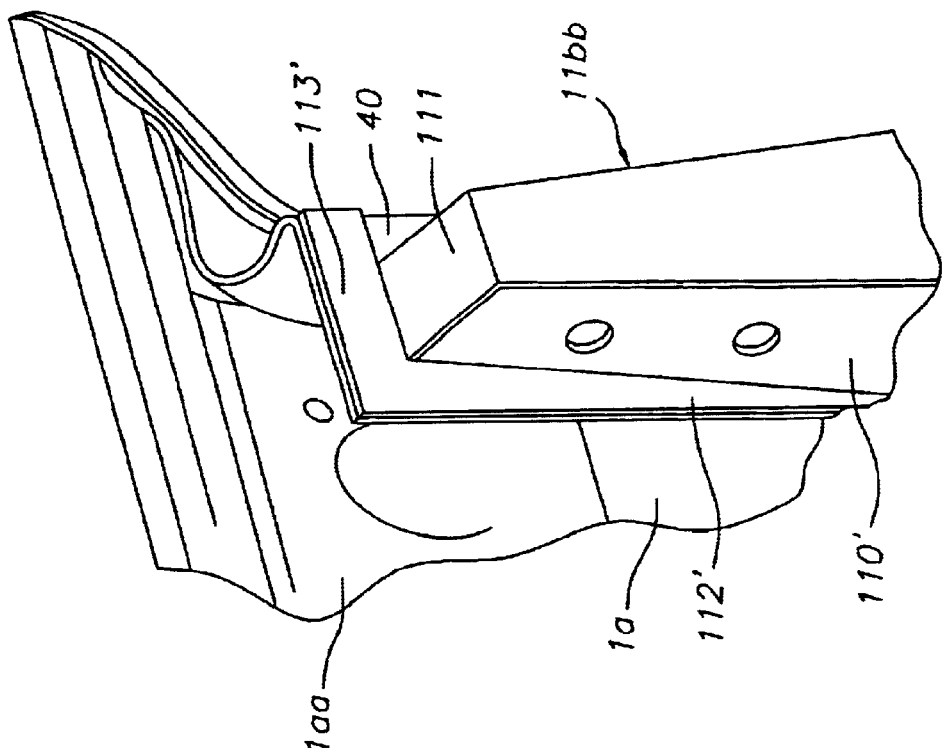
FIG. 4d as FIG. 4cc but without the sealing element fixed on the end face of the fixing beam.
Figure 3E:
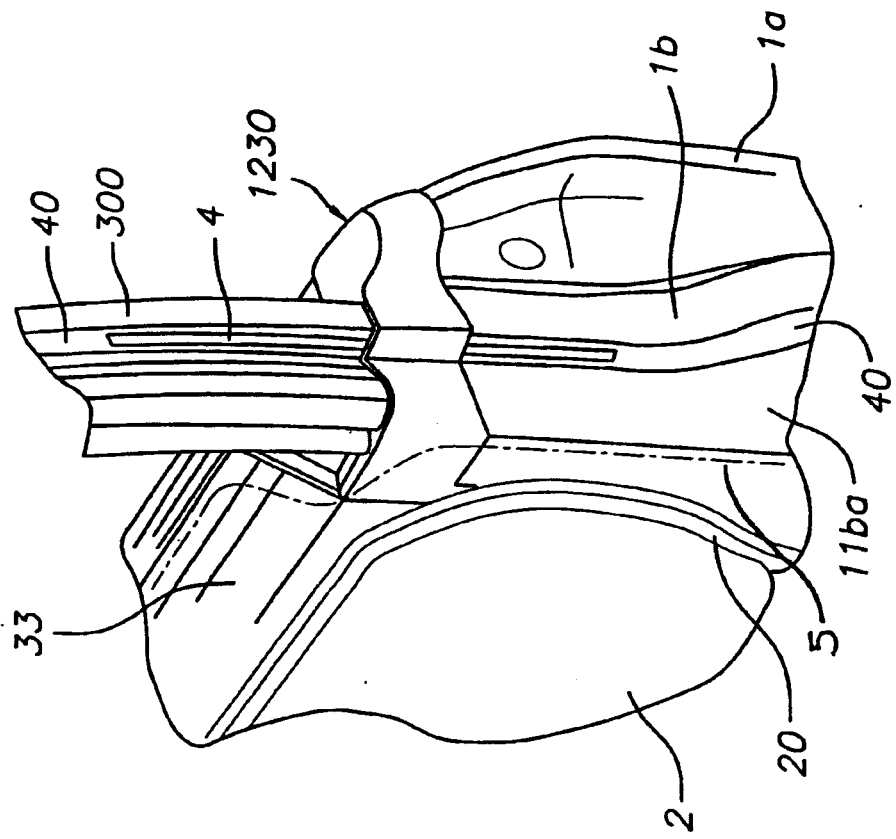
Figure 3D:
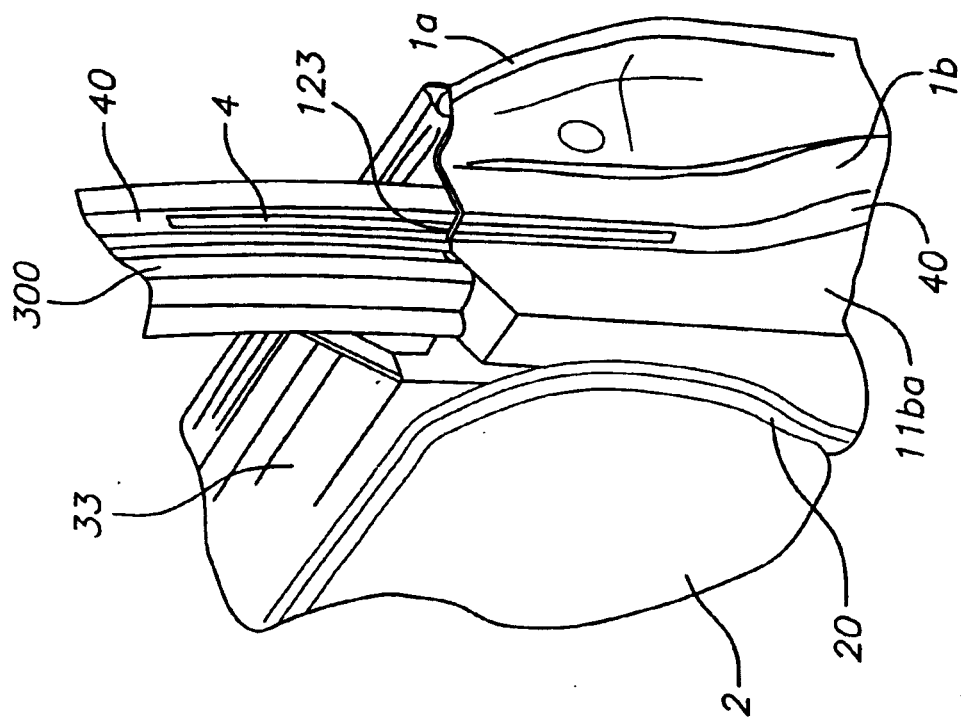
Figure 4C:
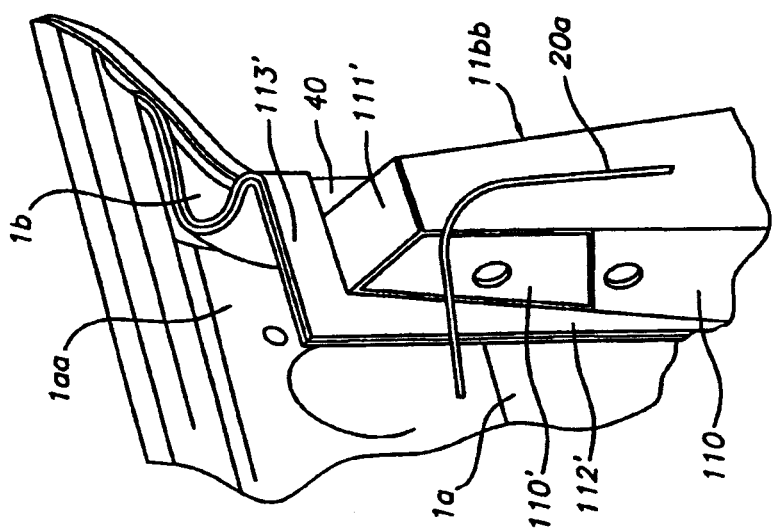
Figure 4B:
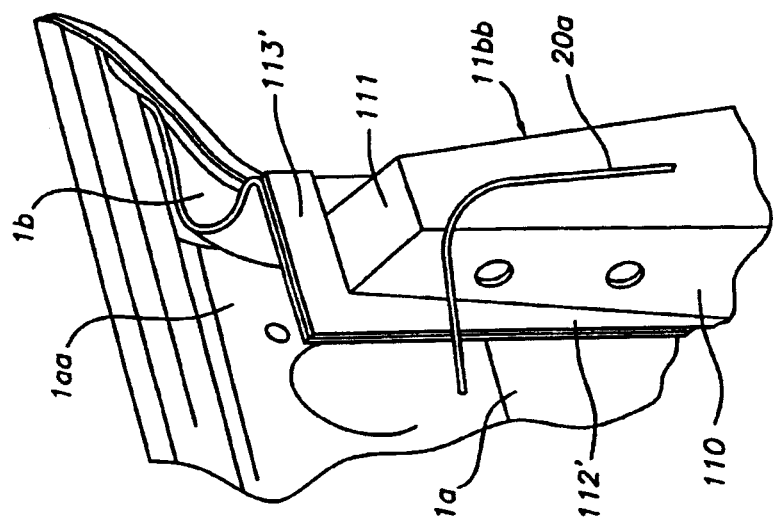
Figure 4A:
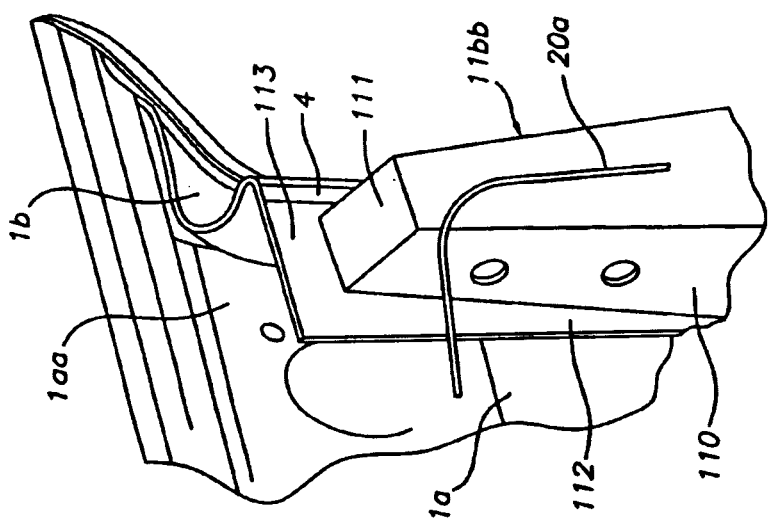

The embodiments illustrated in FIGS. 4d and 4e differ only through the design element 1130 formed in one piece on the seal which covers the acute angled corner of the door outer skin 1a. To this end a fastening part 31 can advantageously be combined with a seal arranged on the downward facing surface 301 of the window frame section 300 and supported on the upward facing surface 111 of the fastening region 11bb.

Figure 5C:
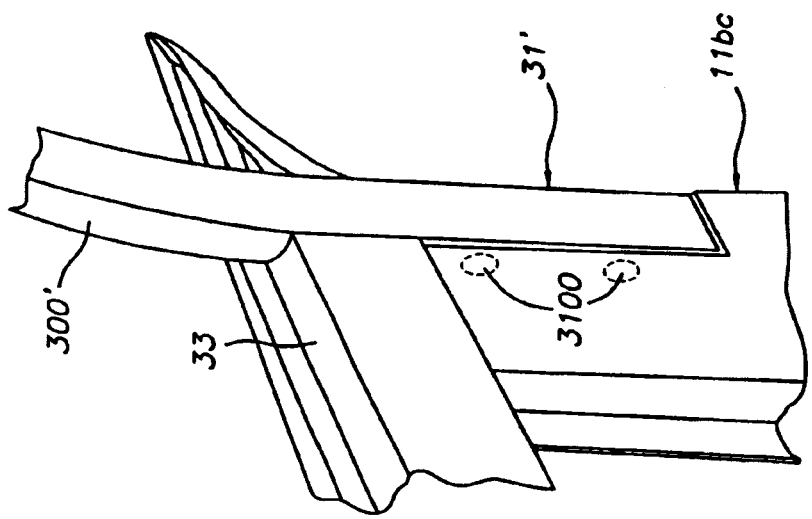
FIG. 5c shows a view of the assembly of the parts of FIG. 5a and 5b.
Figure 5B:
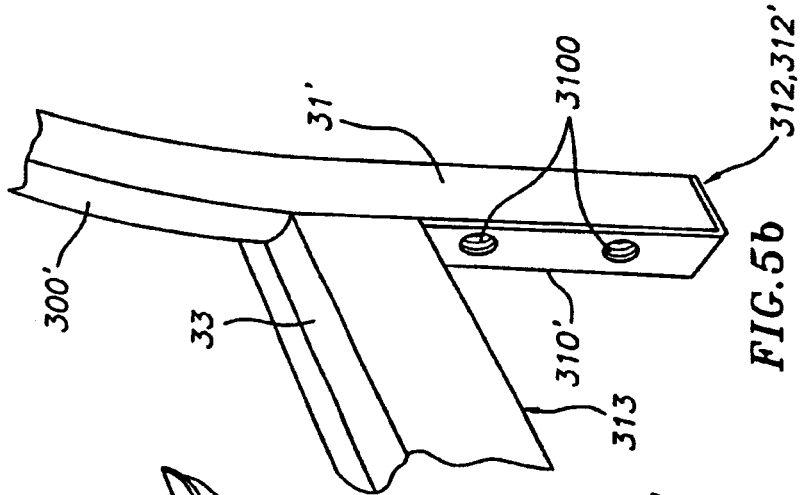
FIG. 5b shows a view of the cut out section of a frame structure with a fastening part directly formed on the window frame side piece.
Figure 5A:
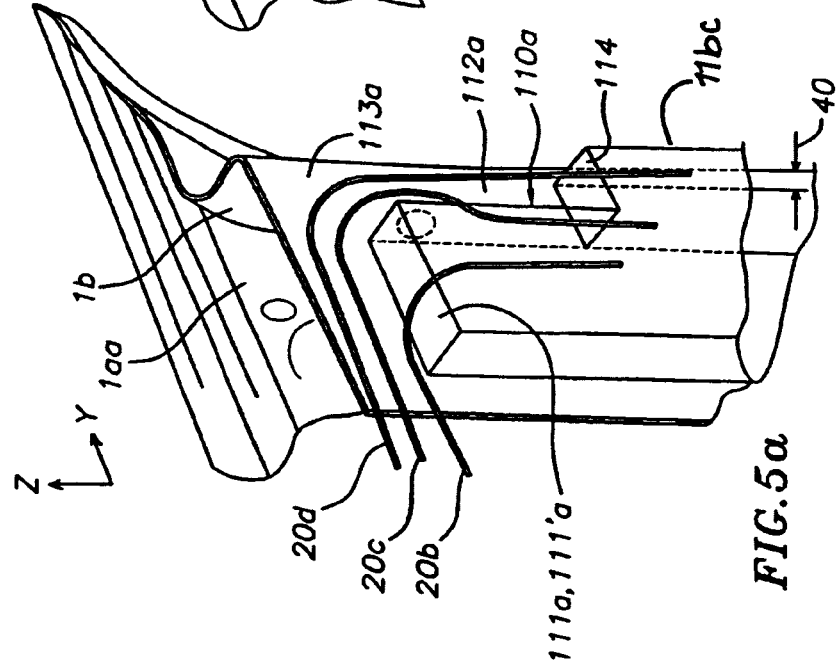
FIG. 5a shows a perspective view of the part having the fastening region of the door body with an outwardly open angled socket and indications for three possible different paths of the sealing element of the wet/dry space partition.

From the perspective view of FIG. 5a a variation of the invention is shown whose fastening region 11bc on the door body side has an outward opening angled socket for receiving the fastening part 31' on the frame side (see FIG. 5b). This fastening part 31' is formed as a direct extension of the window frame region 300' and is covered on its screw face 310' and the downward facing support surface 312' with sealing elements. Furthermore the side support face 113a can also be provided with a sealing element which is not shown in this illustration and which extends up to the outer seal 4 which extends along the vertically aligned base surface 40. In the described embodiment the sealing element 20 can extend corresponding to the contour 20d indicated over surface 112a and up to the interface between the surface 114 and 312'.

If however the sealing element is to be omitted between the faces 114 and 312 then the path of the seal 20 can correspond to the contour 20c which does not intersect the corresponding interface areas 114, 312 to prevent penetration of dampness.

If in addition the sealing element at the screw surface 310' is to be omitted then as a replacement a sealing element can be provided between the faces 111a, 111a' and 313. The permissible region of the sealing element 20 would then be restricted to the path of the contour 20b wherein the interface between the surfaces 110a and 310' is no longer crossed. FIG. 5c shows only the assembly of the door body and frame module in the region of the binding areas 11bc, 31'.

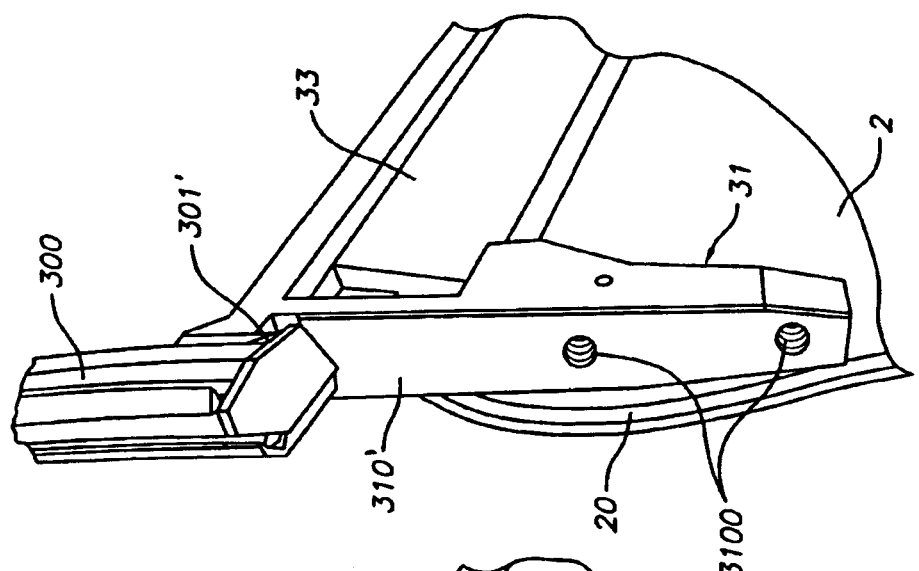
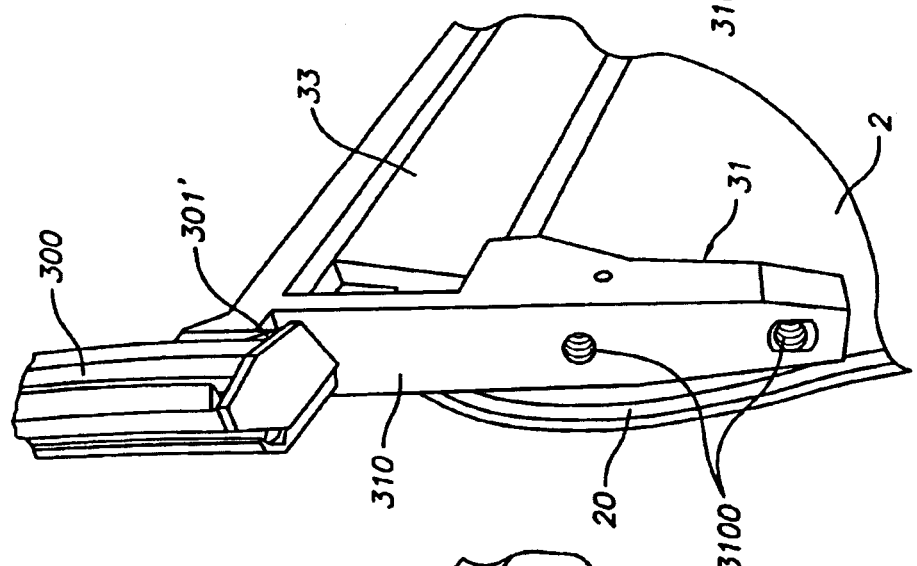
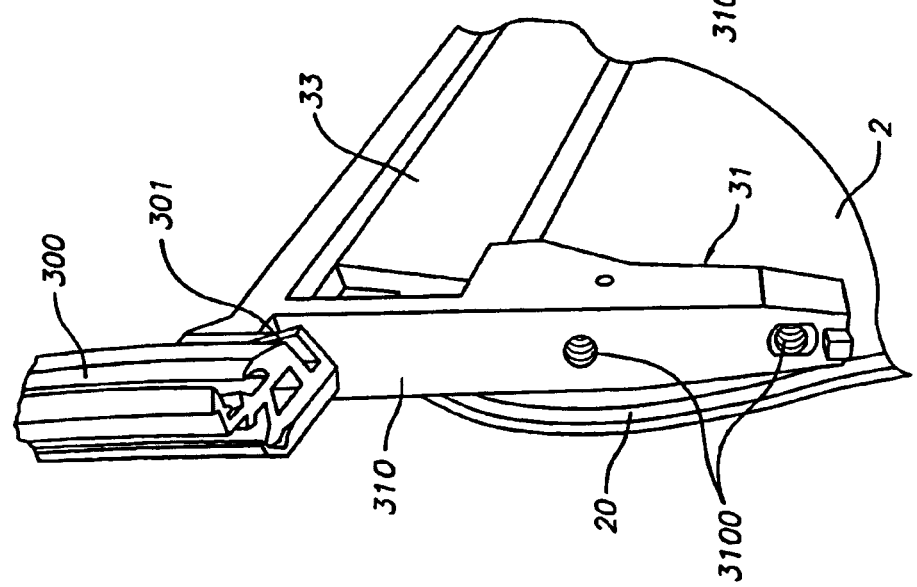

What is claimed is:

1. A motor vehicle door comprising:
   a door body formed from a door outer skin and a door inner skin;
   a wet/dry space partition having a first sealing element;
   a large surface cut out section in the door inner skin covered by the wet/dry space partition
   a frame structure which contains a window frame and is connected through at least one fastening part to the door body; and
   an outer seal proximate to the door inner skin, wherein the wet/dry space partition covers at least in part a fastening region proximate to the door inner skin and a door inside window sill,
   wherein the first sealing element runs through an overlap region of the wet/dry space partition, and
   wherein a second sealing element is mounted between the frame structure and the door body and extends at least from an outer contour of the first sealing element of the wet/dry space partition up to the outer seal of the vehicle door.

2. The motor vehicle door according to claim 1, wherein a sealing plane of the second sealing element runs at an angle to a sealing plane of the first sealing element.

3. The motor vehicle door according to claim 1, wherein projections of the second sealing element and an outer contour of the first sealing element cross in an X-Z plane.

4. The motor vehicle door according to claim 3, wherein the second sealing element in addition crosses the outer seal of the vehicle door.

5. The motor vehicle door according to claim 1, wherein the first sealing element, the second sealing element as well as the outer seal of the vehicle door form a cohesive sealing contour.

6. The motor vehicle door according to claim 1, wherein the wet/dry space partition is produced through a support plate of a door module which is equipped with function units and whose outer contour is one of formed as a peripheral seal and supporting the first sealing element.

7. The motor vehicle according to claim 6, wherein the function units are at least one of window lifters, locks, and control devices.

8. The motor vehicle door according to any one of the preceding claims, wherein the second sealing element is prefitted on at least one of the fastening region of the frame structure and on the door body.

9. The motor vehicle door according to claim 1, wherein the at least one fastening part of the frame structure lies at least in part inside a surface enclosed by the outer seal.

10. The motor vehicle door according to claim 1, wherein projections of substantially vertically aligned frame posts of the window frame form the at least one fastening part.

11. The motor vehicle door according to claim 1, wherein the at least one fastening part is spaced from substantially vertically aligned frame posts towards a door center and is attached to a frame post proximate to the window sill, which is substantially horizontally aligned and which forms a lower section of the window frame.

12. The motor vehicle door according to claim 1, wherein the at least one fastening part can be inserted in and connected to an outwardly opening angled socket of the fastening region proximate to the door body.

13. The motor vehicle door according to claim 1, wherein the at least one fastening part can be inserted in and connected to an inwardly open angled section of the fastening region of the door inner skin.

14. The motor vehicle door according to claim 1, wherein a clearance between sealing faces of the frame structure and the door body can be fixed by positioning means.

15. The motor vehicle door according to claim 14, wherein the positioning means are integral in a sealing face of at least one of the door body and the at least one fastening part.

16. The motor vehicle door according to claim 15, wherein the second sealing element is adapted to a path of the sealing face which is fitted with the positioning means.

17. The motor vehicle according to claim 15, wherein the positioning means is in the form of ribs.

18. The motor vehicle according to claim 15, wherein the positioning means is in the form of dished indentations.

19. The motor vehicle door according to claim 14, wherein the clearance between the sealing faces of the frame structure and door body is less than a height of the second sealing element in a non-compressed state.

20. The motor vehicle door according to claim 14, wherein the clearance between the sealing faces of the frame structure and door body is greater than a height of the second sealing element in a non-compressed state and in order to achieve sealing action, at least one of clamping and fixing means is provided, by means of which spacing between the sealing faces of the frame structure and the door body can be sufficiently reduced.

21. The motor vehicle door according to claim 14, wherein the clearance between the sealing faces of the frame structure and door body is filled up by an inflatable seal.

22. The motor vehicle door according to claim 1, wherein the frame structure has two fastening parts.

23. The motor vehicle door according to claim 1, wherein the at least one fastening part are two fastening parts that run substantially parallel and in a vertical direction.

24. The motor vehicle door according to claim 1, wherein the frame structure and the wet/dry space partition which is formed as a door module, form a prefitted unit which supports a door lock, and wherein the at least one fastening part which is remote from the door lock, and an associated socket area in the door body have no projections that could impede swivelling the at least one fastening part into an ideal assembly position.

25. The motor vehicle door according to claim 1, wherein at least one of the door body, the frame structure and the wet/dry space partition have a reference point system for prefitting.

26. The motor vehicle according to claim 1, wherein the outer seal is peripheral.

* * * * *

UNITED STATES PATENT AND TRADEMARK OFFICE
CERTIFICATE OF CORRECTION

PATENT NO. : 6,920,720 B2
APPLICATION NO. : 10/296633
DATED : July 26, 2005
INVENTOR(S) : Sommer et al.

It is certified that error appears in the above-identified patent and that said Letters Patent is hereby corrected as shown below:

On the Title Page

(73) Assignee — Delete "Cobrug", Insert --Coburg--

(57) Abstract, line 1 — Delete "includes a box", Insert --is disclosed which has a--

(57) Abstract, line 11 — After "an area", Insert --of--

In the Drawings

FIG. 3c, Sheet 3 of 9 — Delete Drawing Sheet 3 and subtitute therefore the Drawing Sheet, consisting of Figs. 3a, 3b and 3c, as shown on the attached page FIG. 3e, Sheet 5 of 9 — Delete Drawing Sheet 5 and subtitute therefore the Drawing Sheet, consisting of Figs. 3d and 3e, as shown on the attached page FIG. 4bb, Sheet 7 of 9 — Delete Drawing Sheet 7 and substitute therefore the Drawing Sheet, consisting of Figs. 4aa, 4bb, and 4cc, as shown on the attached page FIG. 5a, Sheet 9 of 9 — Delete Drawing Sheet 9 and substitute therefore the Drawing Sheet, consisting of Figs. 5a, 5b, and 5c, as shown on the attached page

In the Claims

Column 7, line 49, Claim 1 — After "partition", Insert --;--

Column 8, line 16, Claim 7 — After "vehicle", Insert --door--

Column 8, line 53, Claim 17 — After "vehicle", Insert --door--

UNITED STATES PATENT AND TRADEMARK OFFICE
CERTIFICATE OF CORRECTION

PATENT NO. : 6,920,720 B2
APPLICATION NO. : 10/296633
DATED : July 26, 2005
INVENTOR(S) : Sommer et al.

It is certified that error appears in the above-identified patent and that said Letters Patent is hereby corrected as shown below:

Column 8, line 55, Claim 18    After "vehicle", Insert --door--

Column 9, line 7, Claim 23     Delete "are", Insert --is--

Signed and Sealed this

Fourteenth Day of November, 2006

JON W. DUDAS
*Director of the United States Patent and Trademark Office*